(12) United States Patent
Zehetleitner et al.

(10) Patent No.: US 11,149,756 B2
(45) Date of Patent: Oct. 19, 2021

(54) METHOD FOR DETERMINING CLOSED-CONTROL PARAMETERS FOR A HYDRAULIC SYSTEM

(71) Applicant: B&R INDUSTRIAL AUTOMATION GMBH, Eggelsberg (AT)

(72) Inventors: Kurt Zehetleitner, Engerwitzdorf (AT); Lukas Wick, Obergrafendorf (AT); Leopold Griessler, Linz (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 76 days.

(21) Appl. No.: 16/495,699

(22) PCT Filed: Mar. 20, 2018

(86) PCT No.: PCT/EP2018/056996
§ 371 (c)(1),
(2) Date: Sep. 19, 2019

(87) PCT Pub. No.: WO2018/172341
PCT Pub. Date: Sep. 27, 2018

(65) Prior Publication Data
US 2020/0096013 A1 Mar. 26, 2020

(30) Foreign Application Priority Data
Mar. 20, 2017 (AT) .............................. A50223/2017

(51) Int. Cl.
*F15B 11/04* (2006.01)
*G05B 13/02* (2006.01)

(52) U.S. Cl.
CPC ............ *F15B 11/04* (2013.01); *G05B 13/025* (2013.01); *G05B 2219/41318* (2013.01)

(58) Field of Classification Search
CPC ........ G05B 13/025; G05B 2219/41318; G05B 13/045; G05B 13/021; F15B 11/04
See application file for complete search history.

(56) References Cited

U.S. PATENT DOCUMENTS

| 4,451,878 A | 5/1984 | Shigemasa |
| 4,539,633 A * | 9/1985 | Shigemasa ........... G05B 13/042 318/561 |

(Continued)

FOREIGN PATENT DOCUMENTS

| DE | 37 50 203 | 11/1994 |
| DE | 43 42 057 | 6/1995 |

(Continued)

OTHER PUBLICATIONS

Austria Search Report conducted in Austria Appln. No. A50223/2017 (dated Jan. 26, 2018).

(Continued)

*Primary Examiner* — Abiy Teka
(74) *Attorney, Agent, or Firm* — Greenblum & Bernstein, P.L.C.

(57) ABSTRACT

In order to carry out largely automated parameterisation of the closed-loop control parameters for closed-loop control of a hydraulic system comprising a servo drive, a method and a device for determining the closed-loop parameters of a closed-loop control unit of the hydraulic system are specified, wherein an actual system pressure of a hydraulic consumer of the hydraulic system is closed-loop controlled by means of a predefined set point rotational speed of a servo drive, wherein an actual rotational speed of the servo drive follows the predefined set point rotational speed, wherein an excitation signal is applied to the setpoint rotational speed, and the actual system pressure which is set here is measured, the dynamics of the hydraulic system are acquired from the actual rotational speed and/or the setpoint rotational speed (Continued)

and the actual system pressure, and the closed-loop control parameters are calculated from the acquired dynamics.

17 Claims, 3 Drawing Sheets

(56) References Cited

U.S. PATENT DOCUMENTS

| | | | |
|---|---|---|---|
| 4,882,526 A | | 11/1989 | Iino et al. |
| 5,468,126 A | * | 11/1995 | Lukich .................. F02D 29/04 123/383 |
| 5,726,877 A | | 3/1998 | Antoszkiewicz et al. |
| 8,239,069 B2 | * | 8/2012 | Yuan .................. F15B 13/0433 700/282 |
| 9,240,819 B1 | | 1/2016 | Ku |
| 9,738,023 B2 | | 8/2017 | Ohta et al. |
| 2002/0040250 A1 | | 4/2002 | Gaikwad et al. |
| 2004/0055289 A1 | * | 3/2004 | Pfaff ...................... G05B 19/43 60/422 |
| 2016/0033944 A1 | | 2/2016 | El-Shaer et al. |
| 2016/0265520 A1 | | 9/2016 | Skinner et al. |

FOREIGN PATENT DOCUMENTS

| | | | |
|---|---|---|---|
| DE | 44 46 296 | 6/1995 | |
| DE | 198 42 565 | 8/2005 | |
| EP | 2 752 719 | 7/2014 | |
| EP | 2752719 A1 * | 7/2014 | ........... G05B 13/021 |
| KR | 2011 0005076 | 1/2011 | |
| WO | 98/26335 | 6/1998 | |

OTHER PUBLICATIONS

I.D. Landau et al., "Introduction to Adative Control ", Adaptive Control, Communications and Control Engineering, DOI 10.1007/978-0-85729-664-1_1, © Springer-Verlag Limited 2011 , pp. 1-34.
Lian-Wang Lee et al., "The Positioning Control of an Eletro-Hydraulic Variable Rotational Speed Pump-Controlled System Using Adaptive Fuzzy Controller with Self-Tuning Fuzzy Sliding Mode Compensation ", 2011 IEEE International Conference on Fuzzy Systems, Taipei, Taiwan, Jun. 27-30, 2011, pp. 543-548.
Written Opinion (Translation) conducted in Int'l Appln. No. PCT/EP2018/056996 (dated Jul. 26, 2018).

* cited by examiner

METHOD FOR DETERMINING CLOSED-CONTROL PARAMETERS FOR A HYDRAULIC SYSTEM

The present invention relates to a method for determining control parameters of a control unit of a hydraulic system, wherein an actual system pressure of a hydraulic load of the hydraulic system is controlled by a predetermined target speed of a servo drive, wherein the actual speed follows the predetermined target speed. Furthermore, the present invention relates to a hydraulic system comprising a servo drive which has a target speed predetermined by a control unit, wherein an actual speed of the servo follows the predetermined target speed, and comprising a hydraulic load which has an actual system pressure which is controlled by the predetermined target speed.

Hydraulic systems consist of hydraulic generators and hydraulic loads. A servo drive is usually used as a hydraulic generator, and, for example, hydraulic cylinders, hydraulic motors, hydraulic capacitors, etc., can be used as hydraulic loads. In this context, a servo drive is usually understood to be a combination of motor and pump, with the motor being powered by a converter. The speed of the motor of the servo drive is highly dynamically variable and controls a hydraulic volume flow conveyed by the pump. This in turn brings about a change in a hydraulic actual system pressure in the hydraulic system. The control of the system pressure is therefore essential in all hydraulic loads. Typically, control of a hydraulic system uses a PID structure or a PID-like structure with additional filters. According to the current prior art, the necessary control parameters must be determined by trial and error, i.e. by iterative manual tuning on the hydraulic system. On the one hand, this is very time-consuming because tests have to be carried out time and again and, on the other hand, requires experienced specialist personnel. Thus, even in the presence of more detailed documentation, the actual adjustment of the control parameters depends very much on the relevant user, with there being some rule of thumb procedures for this purpose, such as the Ziegler-Nichols method. Depending on the control structure used, the number of parameters to be determined and thus the effort for setting the control change. It is therefore difficult to manually design a controller due to insufficient knowledge of the path dynamics over the entire frequency range. In addition, a readjustment of the control parameters may also be necessary during operation, for example when boundary conditions change, for example due to wear of components. As mentioned, the determination of the control parameters is complex in principle. In addition, it is difficult to configure the control parameters that achieve a desired dynamics. The dynamics describes the input/output behavior of the hydraulic system, i.e. in this case the response of the actual system pressure to a change in the target system pressure. If the hydraulic system has a high degree of dynamics, for example, an actual system pressure can also sufficiently follow rapid changes in the target system pressure.

DE 198 42 565 A1 discloses a hydraulic system comprising a plurality of centrifugal pumps. The necessary connection and disconnection of individual centrifugal pumps creates undesired pressure surges, which fundamentally act as a disturbance in the system. However, the pressure surges are used in DE 198 42 565 A1 to parameterize the control parameters of the PID controller. A transfer function in the form of a PTn element, i.e. with a counter order of zero, is determined, and from this the control parameters are determined. PTn elements, i.e. a series of n PT1 elements, are usually not capable of oscillation. Although occurring pressure surges can be well detected, they are not well suited as a prompt in a system for system identification for controller parameterization, which is why rapid and precise parameterization is not possible.

The problem addressed by the present invention is therefore to provide a method and a device using which the parameterization of the control parameters for control of a hydraulic system, comprising a servo drive, is largely automated, quick and accurate.

According to the invention, an excitation signal is applied to the target speed and the resulting actual system pressure is measured. The dynamics of the hydraulic system is determined from the actual speed and/or the target speed and the actual system pressure, and the control parameters are also calculated from the determined dynamics. Furthermore, according to the invention a control unit is provided which is configured to apply an excitation signal to the target speed and to measure the resulting actual system pressure of the hydraulic system, to determine the dynamics of the hydraulic system from the actual speed and/or the target speed and the actual system pressure, and to calculate the control parameters of the control unit from the determined dynamics. It is thus possible to determine the control parameters of the control unit of the hydraulic system in a fraction of the time that would be required for manual tuning. In addition, the sequence of determination of the control parameters is reproducible and takes place independently of the relevant user, in particular also in an automated manner. The method according to the invention makes it possible to identify a hydraulic system that is unknown in the dynamic properties. By applying an excitation signal to the target speed of the servo drive, the unknown hydraulic system can be effectively dynamically excited for identification. This means that the hydraulic system is a "black box" of which the internal structure is unknown or does not need to be known. It is therefore limited to an examination of the input-output relationships, with any internal properties or dynamic parameters not being used, even if they were known in advance.

Since an external excitation signal is applied to the target speed, the excitation signal can be selected freely. This makes it possible to apply special excitation signals that are particularly suitable for the excitation, e.g. wide-band signals, in order to parameterize the controller parameters particularly rapidly and accurately.

Advantageously, a compensating filter for the control unit can additionally be parameterized from the determined dynamics. Since the method according to the invention makes it possible to adapt the control parameters to current process conditions by means of measurements in the ongoing process, a compensation filter can thus also be parameterized automatically if required. The dynamics of the hydraulic system that has already been identified can be investigated following undesired behavior in certain frequency ranges (e.g. strong resonance behavior) and further amplified or attenuated. Both significant noise reduction and a higher dynamic range is thus possible.

Compensation filters are used to suppress undesired behavior in the frequency range, for example to suppress resonance behavior at a certain frequency or, vice versa, to raise the system gain at this frequency in the event of anti-resonance behavior. By predetermining the target system pressure and the target speed of the servo drive and by applying an excitation signal to the target speed, the hydraulic system is excited. As part of this, information on the dynamics of the control loop is obtained from the actual system pressure and the actual speed and/or the target speed. By means of this obtained information, all necessary adjustment parameters of the control unit are further calculated. Alternatively, a number of control parameters can also be predetermined by a user and the other necessary control parameters can be calculated according to the invention. Using the method according to the invention, various advantages result: Therefore, the procedure of setting the control parameters of the control unit is significantly accelerated. In addition, the result is reproducible and no longer dependent on the specific user due to the possible automated process. If prepared accordingly, the method can also be implemented by non-experts.

Advantageously, a constant initial speed is predetermined for the target speed before the application of the excitation signal, at which point an initial pressure results in the hydraulic system as the actual system pressure. This sets an operating point for the actual speed and thus also the actual system pressure.

Advantageously, the hydraulic load is a hydraulic cylinder, in particular a differential hydraulic cylinder.

The actual system pressure can thus describe a pressure of a hydraulic cylinder; the pressure of a hydraulic motor, etc., would be conceivable.

The excitation signal applied to the initial speed is usually a wide-band signal. Particularly suitable is a combination of step-like excitation, harmonic signals with increasing frequency, and pulse-shaped signals. Therefore, a square wave signal, a harmonic signal, preferably with increasing frequency, pulses, or a mixed signal is advantageously used as the excitation signal.

Different representations can be used to describe the dynamics of the hydraulic system. From the recorded system input, i.e. the actual speed and/or the target speed, and the system output, i.e. the actual system pressure, the transfer function is determined. The identified transfer function, which describes the system dynamics, thus represents the relationship between the system input, i.e. the actual speed and/or the target speed, and the system output, i.e. the actual system pressure. Therefore, advantageously, the dynamics of the hydraulic system can be described by a transfer function.

The transfer function, i.e. the identification of the controller loop, can be determined or approximated using known methods such as the Fast Fourier Transform (FFT) or the method of least squares (LSQ), although other methods, such as the Ziegler-Nichols method, can be used to identify the controller loop. The Fast Fourier Transform splits a signal into its frequency components. Applied to the input and output of the present system, i.e. here the actual speed or the target speed and the actual system pressure, the transmission behavior in the frequency range can be concluded therefrom, which can be used for the further design of the control parameters. The method of least squares (LSQ), however, is a standard method for the compensation calculation. It can be used to estimate an approximation to the transfer function.

A frequency characteristic design method can advantageously be applied to the dynamics of the hydraulic system thus obtained in order to calculate the control parameters in the frequency range. In the frequency characteristic design method, control parameters are determined on the basis of requirements on the transient behavior of the responses of the closed loop to certain selected test functions as default parameters, such as jumps in the target system pressure, which in turn are transferred into requirements on an open-loop Bode plot of the dynamic hydraulic system. Requirements on the closed loop include, for example, the rise time and overshoot of the step response of the dynamic hydraulic system. Using this method, the control parameters can thus be calculated from characteristics of the step response of the closed control loop (default parameters). The default parameters thus describe the step response of the hydraulic system, i.e. how rapidly the actual system pressure reaches the target system pressure after a jump in the target system pressure.

The selection of the most suitable method for determining the control parameters generally depends on the structure of the controller to be parameterized, i.e. on the control parameters to be determined themselves. Thus, the control parameters of a PID controller, for example, as well as a linear-quadratic controller (LQR), can be determined. A linear-quadratic controller, also known as a Riccati controller, is a state controller for a linear dynamic system of which the feedback matrix is determined by minimizing a quadratic cost function, at which point the actual system pressure is controlled to the target pressure.

Both the Fast Fourier Transform (FFT), the least squares method (LSQ), and the frequency characteristic design method, as well as linear-quadratic controllers (LQR), are well known and therefore will not be described in detail here.

If additional filtering (actual pressure filtering, compensation filters or the like) in the control loop is advantageous, this is indicated to the operator and configured automatically.

Depending on the application, the user can decide whether an overshoot of the actual system pressure is allowed, whereby a rapid increase in pressure is possible, or whether overshoot is not allowed, whereby the increase in the actual system pressure is more heavily attenuated. If no overshoot is desired, the control parameters are designed in such a way that the controller reacts "more gently," i.e. the control variable is not increased so aggressively during a jump in the target system pressure in order to equalize the actual system pressure to the target system pressure. This prevents overshooting for the most part.

Furthermore, the rise time of the target system pressure after a jump can be parameterized, depending on the target speed, using an intuitive, easy-to-understand parameter. The designed controller can thus be tested by analyzing the step responses in the closed control loop, at which point the verification of the control behavior can be carried out by a user.

After determining the control parameters, the control behavior of the hydraulic system can be verified by predetermining sudden changes in the target system pressure, and then observing the behavior of the hydraulic system, in this case the step response of the actual system pressure. It can thus be evaluated whether the automatically parameterized pressure control meets the requirements of the operator, and if necessary, the sub-procedure for control configuration can be restarted with a different control structure or a modified rise time.

The control unit can be integrated in the servo drive, i.e. in a decentralized manner, or can be integrated in a parting unit superordinate to the servo drive, e.g. as a standalone library function on the control, i.e. centrally.

The method according to the invention for determining the control parameters can be restarted at any time during normal operation and the control parameters can also be readjusted during the process to changes in the process boundary conditions (e.g. temperature changes, leakage changes, wear to the hydraulic switching valve, change in hose lengths or the like).

In the following, the present invention will be explained in more detail with reference to FIG. 1 to 5, which show exemplary advantageous embodiments of the invention in a schematic and non-limiting manner. In the drawings.

Figure 1:
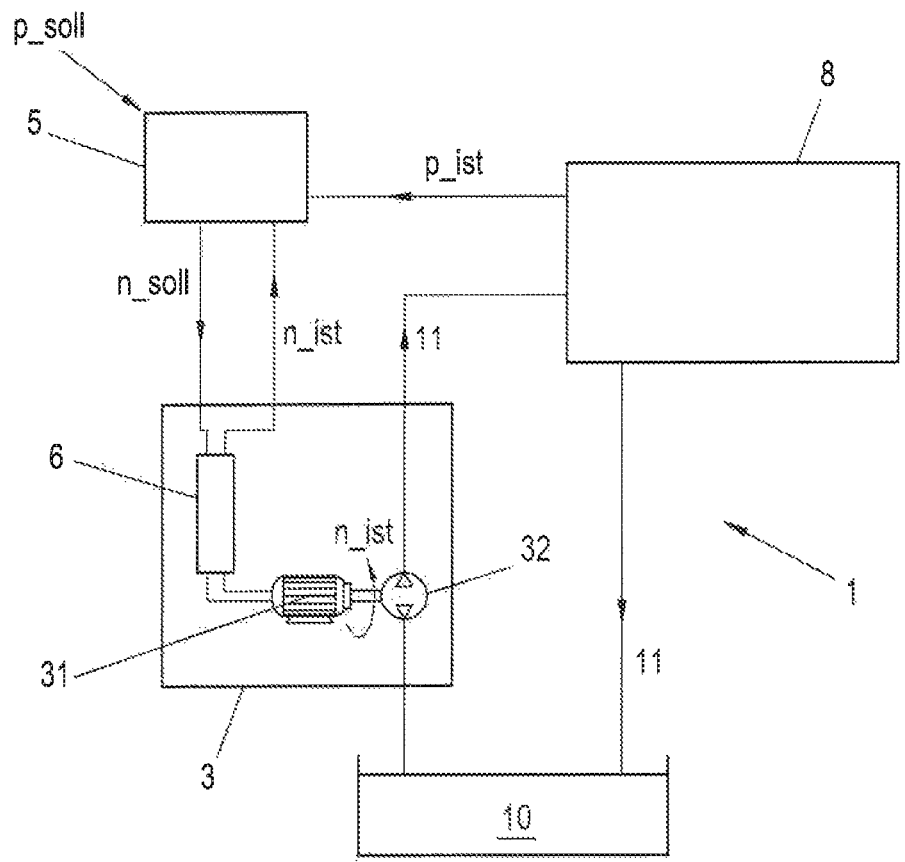
FIG. 1 shows a hydraulic system comprising a general hydraulic load.

FIG. 1 shows an exemplary hydraulic system 1. A hydraulic load 8 has an actual system pressure p_ist, which is regulated by an actual speed n_ist of a servo drive 3. The servo drive 3 is composed of a motor 31 and a pump 32. FIG. 1 shows an open hydraulic circuit, i.e. that the pump 32 conveys a medium 11, for example hydraulic fluid, from a (mostly pressureless) tank 10 and the medium 11 passes from the hydraulic load 8 back into the tank 10. As a result, the actual system pressure p_ist in the hydraulic load 8 is influenced.

The target system pressure p_soll is predetermined for the control unit 5, for example a PLC, by a user or a program. The target speed n_soll is controlled from the actual system pressure p_ist and the target system pressure p_soll by a pressure regulator, which is implemented here on the control unit 5. For this purpose, the actual system pressure p_ist is likewise supplied to the control unit 5. Furthermore, the actual speed of the servo drive 3 is controlled by a speed regulator, which receives the target speed n_soll from the pressure regulator, i.e. from the operating unit 5 in this case. The speed regulator, however, is implemented on the control unit 6 in this case. The control unit 6 can be represented by an ACOPOS servo amplifier, for example, which provides the servo drive 3 with the necessary current required for following the predetermined target speed n_soll. Both the pressure regulator and the speed regulator can be implemented at any point in the hydraulic system, as already mentioned. For example, it is also possible for the pressure to be regulated on the control unit and only the speed to be regulated on the servo drive 3. The servo drive 3 conveys the medium 11 depending on the actual speed p_ist and thus regulates the actual system pressure p_ist in the hydraulic load 8. Until now, according to the prior art, the control parameters of the control unit 6 have been set manually and iteratively. By way of example, a possible manual setting of the control parameters of a control unit 6 designed as a PID controller shall be described, in which a gain factor $K_P$, an integration time constant $T_I$ and a differentiation time constant $T_D$ are determined as control parameters of the PID controller in a known manner. In this case, at the start a pressure filter is suitably parameterized, i.e. a filter time $T_f$ is determined by the measured actual system pressure p_ist being filtered. Signals delivered by pressure sensors usually show superimposed noise, resulting e.g. from interference from the environment. This noise causes unpleasant noises when controlling the actual pressure, is transmitted directly to the speed regulator via the pressure regulator and thus has an effect on the actual speed. Therefore, the noise is not only audible, but also has other negative influences, for example on the service life of components. The pressure filter normally has the characteristics of a first order low-pass filter. If the cutoff frequency of this pressure filter is selected to be too low, high attenuation is achieved even at low frequencies, whereby information is lost in the event of rapid changes in pressure and the regulation becomes slower. If the filter time $T_f$ is selected to be too low, disturbances of the actual system pressure p_ist are not suppressed enough, which causes the servo drive 3 not to run smoothly. Too high a filter time $T_f$, on the other hand, causes slower regulation of the actual system pressure p_ist. The determination of an initial value of the gain factor $K_P$ is further taken as a starting point. For this purpose, a desired target system pressure p_soll is set and the hydraulic load 8 is brought into an initial state, for example by a piston of the hydraulic load 8 being brought into a striking position. The gain factor $K_P$ is then gradually increased until an oscillation, for example a sinusoidal oscillation around the target system pressure p_soll, results for the actual system pressure p_ist.

Figures 2A, 2B:
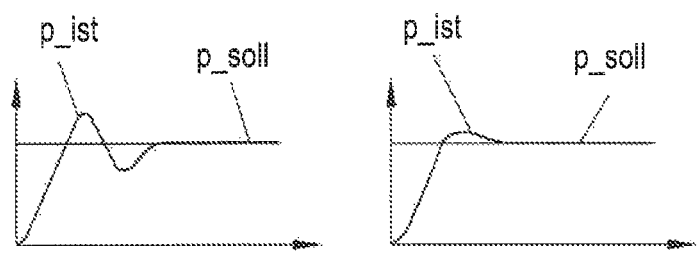
FIG. 2a shows an overshoot and undershoot of the actual system pressure.
FIG. 2b shows an exemplary desired curve for the actual system pressure.

This oscillation is e.g. recognizable by louder engine noise of the servomotor 3 than previously, since an oscillation of the actual system pressure p_ist is also noticeable in the actual speed n_ist. An oscillation of the actual system pressure p_ist is primarily visible in the actual pressure signal, which is measured by a sensor. Since the actual system pressure is directly related to the actual speed via the system dynamics, this will then also oscillate. The gain factor $K_P$ is then reduced by 20%. If, furthermore, an oscillation of the actual system pressure p_ist is noticeable, then the gain factor $K_P$ is reduced gradually until no oscillation is noticeable. An initial value of the integration time constant $T_I$ of the pressure regulator is then adjusted. To do this, a desired target system pressure p_soll is set, once again the hydraulic load 8 is brought into an initial position and jumps in the target system pressure are applied. The integration time constant $T_I$ is then gradually reduced until an undershoot of the actual system pressure p_ist, shown by way of example in FIG. 2a, results and then the integration time constant $T_I$ is increased by 10%. If an undershoot already results with the initial value, then integration time constant $T_I$ is gradually increased until the undershoot at the actual speed n_ist disappears. A suitable starting value for the integration time constant $T_I$ would be $T_I$=0.1 sec. for example. For the differentiation time constant $T_D$, too, an initial value is set and then the differentiation time constant $T_D$ is gradually increased until barely any overshoot of the actual system pressure p_ist can be identified. If the overshoot of the actual system pressure p_ist is already too heavily suppressed with the initial value of the differentiation time constant $T_D$, the differentiation time constant $T_D$ is gradually reduced until the overshoot is barely identifiable, as shown by way of example in FIG. 2b. If oscillations occur when increasing the differentiation time constant $T_D$, these can also be attenuated by adjusting a filter time constant of the differentiator $T_1$. Thus, a first determination of the control parameters takes place. During operation, however, readjustments must be made frequently, e.g. in accordance with the pattern just mentioned. Apart from the large amount of time required for setting the control parameters, a disadvantage is that, despite detailed documentation, the specific parameterization of the control parameters depends heavily on the user.

Figure 3:
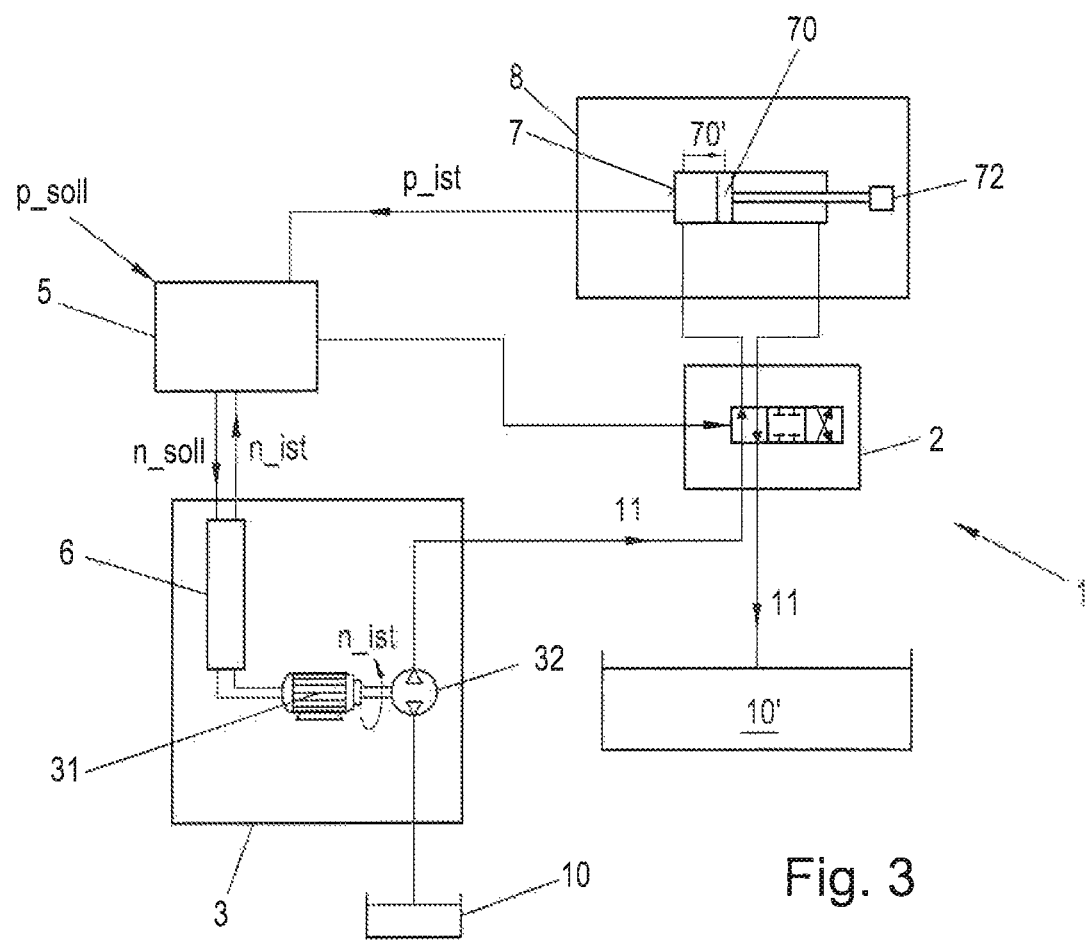
FIG. 3 shows a hydraulic system comprising a differential hydraulic cylinder as a hydraulic load.

FIG. 3 shows a specific embodiment of a hydraulic system 1. In this figure, the hydraulic load 8 is designed as a differential hydraulic cylinder 7, which is connected to a switching valve 2. The switching valve 2 is further connected both to a servo drive 3 (consisting of a motor 31 and a pump 32) and to a tank 10. As already mentioned with regard to the general embodiment from FIG. 1, an open loop of the hydraulic system 1 can also be seen in FIG. 3. In an open loop, a medium 11 is conveyed from a tank 4 (which usually has atmospheric pressure) by means of the pump 32 of the servo drive 4, at which point the medium 11 is returned into the tank 4 from the hydraulic load 8. However, the present method is not limited only to hydraulic systems 1 having open hydraulic circuits, but is also applicable to hydraulic systems 1 having closed hydraulic circuits, i.e. closed tanks 11 which constitute pressure accumulators. The differential hydraulic cylinder 7 includes a piston 70 of which the position 70' in the differential hydraulic cylinder 7 is dependent on the actual system pressure p_ist. The actual system pressure p_ist of the differential hydraulic cylinder 7 is regulated by the actual speed n_ist of the servo drive 3. The target speed n_soll is in turn predetermined for the servo drive 3 by a control unit 5. The control unit 6 in turn regulates the actual speed n_ist to the target speed n_soll provided by the control unit 5. Using the example of the differential hydraulic cylinder 7, the precise regulation of the actual system pressure p_ist for example allows a defined force to be applied by means of the piston rod 72 connected to the piston 70. As an alternative to a differential hydraulic cylinder 7, a hydraulic motor could for example also serve as a hydraulic load 8, which provides a certain moment. The control unit 6 of the hydraulic load 8, in this case this servohydraulic drive train, can be mounted both centrally, i.e. directly on the servo drive 3, as shown in FIG. 3, as well as decentrally in the operating unit 5.

By means of the operating unit 5, the actual system pressure p_ist is detected in the differential hydraulic cylinder 7 and the target speed n_soll for the servo drive 4 is calculated by means of the control unit 6, in order to set a desired target system pressure p_soll in the differential hydraulic cylinder 7. Of course, the actual system pressure p_ist could also be detected and processed directly using the control unit 6.

Figure 4A:
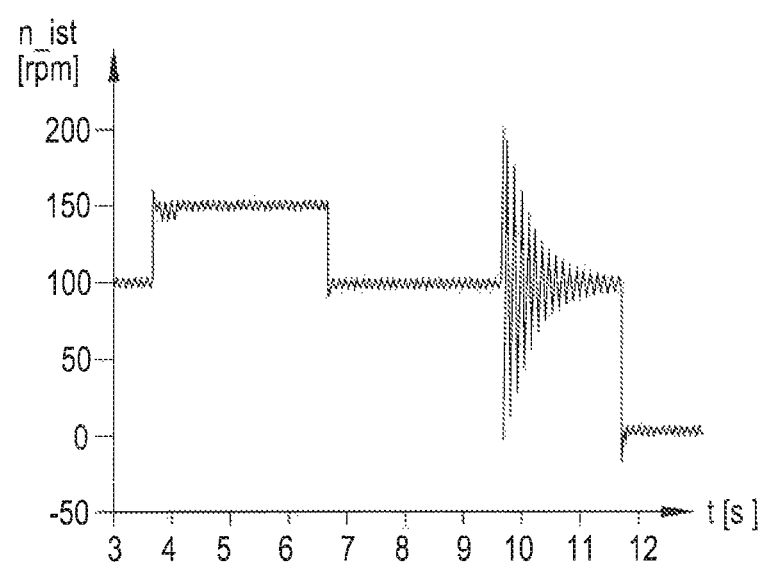
FIG. 4a shows a progression over time of a target speed.
Figure 4B:
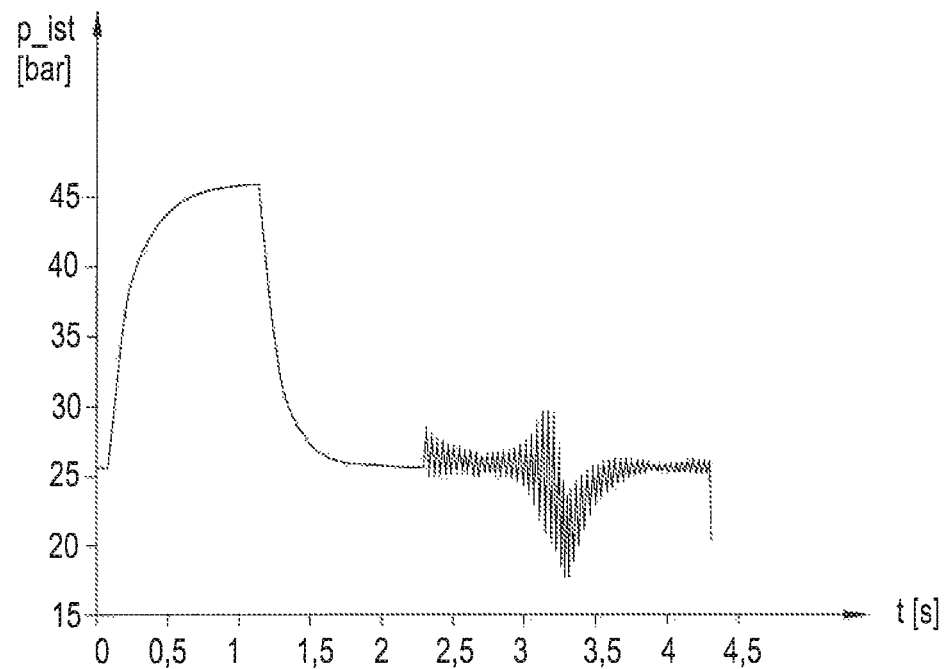
FIG. 4b shows a progression over time of an actual system pressure.

At the start of the method according to the invention for determining the control parameters, in FIG. 3 the piston 70 of the differential hydraulic cylinder 7 is moved into a desired position 70', e.g. an end position, by applying a constant initial speed n0 to the target speed n_soll. Therefore, in the differential hydraulic cylinder 7 of the hydraulic system 1, the actual system pressure p_ist reaches an initial pressure p0, which effectively sets an operating point. It should again be noted that instead of the differential hydraulic cylinder 7 described here, any other hydraulic load is of course conceivable. The hydraulic system 1 is excited by applying an excitation signal n1 to the target speed n_soll. A possible progression over time of the actual speed n_ist after applying the target speed with an excitation signal n1 is shown in FIG. 4a, in which the time t is plotted on the horizontal axis in seconds and the actual speed n_ist is plotted on the vertical axis. The excitation signal is intended to stimulate the dynamics of the control loop, i.e. of the hydraulic system 1. During this excitation, the actual system pressure p_ist is measured in the differential hydraulic cylinder. A possible resulting progression over time of the actual system pressure p_ist is shown in FIG. 4b, in which the time t is plotted on the horizontal axis in seconds and the actual system pressure n_ist is plotted on the vertical axis. From the progression over time of the actual system pressure p_ist and the actual speed n_ist or the target speed n_soll, which can also be measured or provided by the servo drive 3, a transfer function Gp/n(z) for describing the system dynamics is estimated (in the present case, by way of example, a time-discrete (z-range) transfer function, e.g. of the fifth order. Of course, time-continuous (s-range) transfer functions can also be used), for example using the method of least squares. For example, the underlying transfer function Gp/n(z) is:

$$G_{\frac{p}{n}}(z) = \frac{2.399*10^{-4}z^3 - 6.894*10^{-5}z^2 - 1.079*10^{-4}z - 5.007*10^{-6}}{z^5 - 2.647\,z^4 + 2.197\,z^3 - 0.3359\,z^2 - 0.3038\,z + 0.08941}$$

Now, for example, the structure of the transfer function Gp/n(z) is predetermined, in this case of the fifth order, but the parameters of the transfer function Gp/n(z) are unknown. The optimization problem is modeled with the error squares (deviation between the measured values and the values calculated from the parameters of the transfer function Gp/n(z)) as the objective function (error is minimized) in order to determine the parameters of the transfer function Gp/n(z). The unknown parameters are estimated e.g. by means of the method of least squares, which is adequately described in the literature. An abort criterion is not needed here because it is not an iterative method.

The dynamics of the system is thus described by the input-output behavior of the system. The dynamics of the pressure regulator describes the behavior of the target system pressure to the actual system pressure.

Figure 5:
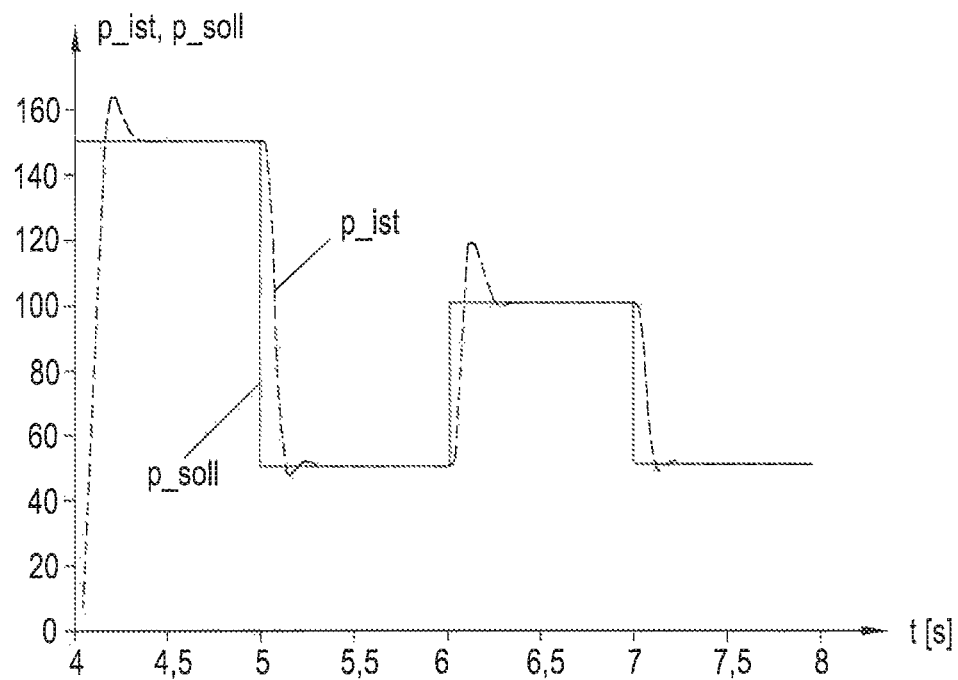
FIG. 5 shows a progression over time of an actual system pressure in response to a step-like progression over time of a target system pressure.

Based on this transfer function Gp/n(z), a PI controller having a gain factor Kp and an integration time constant $T_I$ is parameterized as a control parameter, using a known frequency characteristic method, with no further filtering being carried out. Requirements for the closed loop are thus translated to requirements in the frequency range and the control parameters are calculated there. Specifying these conditions to the closed loop is clearer to the user than directly specifying the control parameters. In the above-mentioned embodiment, the rise time t, was thus set as a requirement to the closed loop. This means that after applying a jump in the target system pressure, the actual system pressure must reach the level change value of the target system pressure within the rise time t, e.g. 0.05 sec. As an additional requirement, an overshoot ue=0% was specified. As is standard in the context of the frequency characteristic method, the requirements for the closed loop are translated into requirements for the open loop (without regulation) by means of approximate relationships. In the frequency response of the open loop, the control parameters of gain factor $K_P$ and integration time constant $T_I$ are calculated and result, for example, in $$Kp - 42.42 \frac{rpm}{bar}$$

and $T_I$=0.085 sec. After calculating the control parameters, a successful parameterization of the control parameters can be verified by specifying jumps in the target system pressure p_soll. As can be seen in FIG. 5, the actual system pressure p_ist follows the predetermined target system pressure p_soll. Since approximate relationships between a closed and open loop are used in the frequency characteristic method, deviations may occur in the actual behavior of the closed loop. Thus, even with a desired low overshoot or no overshoot, e.g. when using a PI controller in combination with a short rise time, a higher overshoot may be evident in the actual system, as can be seen in FIG. 5. In order to reduce or completely suppress this overshoot, instead of the PI controller a PID controller can be parameterized according to the invention, for example.

Due to the generally formulated transfer function Gp/n(z) with multiple poles and zeros, more complex controllers can also be designed as PID controllers. In this way, oscillatory transfer functions with complex conjugate poles can be identified. Such identified resonance frequencies can then be compensated for, by means of a notch filter for example. Anti-resonance frequencies can thus also be identified, which can be compensated for subsequently, e.g. using a biquad filter.

The invention claimed is:

1. A method for determining control parameters of a control unit of a hydraulic system, comprising:
   controlling an actual system pressure of a hydraulic load of the hydraulic system by a predetermined target speed of a servo drive, wherein the servo drive comprises a motor and a pump, and an actual speed of the servo drive follows the predetermined target speed;
   applying an excitation signal to the target speed;
   measuring the resulting actual system pressure, wherein dynamics of the hydraulic system are determined from at least one of the actual speed or the target speed and the actual system pressure; and
   calculating the control parameters from the determined dynamics.

2. The method according to claim 1, wherein a constant initial speed is predetermined for the target speed before the application of the excitation signal, at which point an initial pressure results in the hydraulic system as the actual system pressure.

3. The method according to claim 1, wherein the actual system pressure represents a pressure of a hydraulic cylinder or a hydraulic motor.

4. The method according to claim 1, wherein a square wave signal, a harmonic signal, pulses, or a mixed signal is used as the excitation signal.

5. The method according to claim 4, wherein the harmonic signal has an increasing frequency.

6. The method according to claim 1, wherein the dynamics of the hydraulic system is described by a transfer function of the hydraulic system.

7. The method according to claim 6, wherein the transfer function is determined by a Fast Fourier Transformation.

8. The method according to claim 6, wherein the parameters of the transfer function are approximated by a method of least squares.

9. The method according to claim 1, wherein the control parameters are calculated by a frequency characteristic method.

10. The method according to claim 9, wherein default parameters of a step response, are predetermined for the frequency characteristic method.

11. The method according to claim 10, wherein the default parameters of the step response are rise time and overshoot, and the frequency characteristic method comprises an overshoot and a rise time of the step response.

12. The method according to claim 1, wherein, after determining the control parameters, control behavior of the control unit is verified by step-shaped changes in the system pressure being predetermined and a step response being determined.

13. The method according to 12, wherein a user carries out verification of the control behavior of the control unit.

14. The method according to claim 1, wherein a compensation filter for the control unit is additionally parameterized from the determined dynamics.

15. A hydraulic system comprising:
   a servo drive with a motor and a pump, wherein the servo drive has a target speed predetermined by a control unit, and wherein an actual speed of the servo drive follows the predetermined target speed, and comprising
   a hydraulic load which has an actual system pressure which is controlled by the predetermined target speed, wherein
   a control unit configured to apply an excitation signal to the target speed and to measure the resulting actual system pressure of the hydraulic system, to determine dynamics of the hydraulic system from at least one of the actual speed or the target speed and the actual system pressure, and to calculate the control parameters of the control unit from the determined dynamics.

16. The hydraulic system according to claim 15, wherein the control unit is integrated in the servo drive.

17. The hydraulic system according to claim 15, wherein the control unit is integrated in an operating unit which is superordinate to the servo drive.

* * * * *